United States Patent [19]

Warburton

[11] Patent Number: 4,549,177
[45] Date of Patent: Oct. 22, 1985

[54] PRECISION FATHOMETER INTERFACE ADAPTOR

[75] Inventor: Alan W. Warburton, Long Beach, Miss.

[73] Assignee: The United States of America as represented by the Secretary of the Navy, Washington, D.C.

[21] Appl. No.: 482,692

[22] Filed: Apr. 6, 1983

[51] Int. Cl.[4] .............................................. H04Q 1/39
[52] U.S. Cl. .............................. 340/825.57; 73/170 A
[58] Field of Search ............... 364/420, 433; 340/802, 340/870.13, 825.57, 860; 73/170 A, 300, 312; 367/33, 134

[56] References Cited

U.S. PATENT DOCUMENTS

| | | | |
|---|---|---|---|
| 2,437,416 | 11/1941 | Bludworth | 177/311 |
| 2,759,168 | 3/1954 | Fryklund | 340/29 |
| 3,307,144 | 1/1965 | Epstein et al. | 340/5 |
| 3,594,554 | 6/1969 | Pederson | 235/150.2 |
| 3,818,523 | 10/1971 | Stillman, Jr. | 9/8 R |
| 3,837,224 | 7/1973 | Reams, Jr. | 73/170 |
| 4,163,216 | 7/1979 | Arpino | 340/870.13 |
| 4,425,643 | 1/1984 | Chapman et al. | 340/802 |
| 4,481,514 | 11/1984 | Beukers et al. | 340/870.13 |

Primary Examiner—Donald J. Yusko
Assistant Examiner—Sharon L. Hodgkins
Attorney, Agent, or Firm—R. F. Beers; H. A. David

[57] ABSTRACT

A precision fathometer interface adaptor for interfacing a shallow and a deep water sonar with a computer operated survey system for a 20-line to 16-line data selector is coupled to a multiplexed 16-line data bus. Two sources of bathymertic data are input to the data bus. For 5-bit BCD the four MSD or LSD are selected for input. The output is selected by three operational modes: Select Source 1, Select Source 2 or Automatic. The Automatic mode selects the bathymetric data output for the computer according to the water depth. An externally activated timer generates time/event markers for external devices.

2 Claims, 2 Drawing Figures

PRECISION FATHOMETER INTERFACE ADAPTOR

BACKGROUND OF THE INVENTION

1. Field of the Invention

The present invention relates to computer interface adaptors, and more particularly to a precision fathometer interface adaptor for interfacing a shallow and a deep water sonar with a computer operated survey system.

2. Description of the Prior Art

In ocean survey systems separate bathymetric systems for shallow water and for deep water are used simultaneously. The existing automated survey plotting and positioning system can only input one source of sonar data, and the sources are not always compatible with the survey system. Subsequently, manually intensive methods of data reduction are required to correlate depths with position and to establish bathymetric "control". Additionally manual time/event marks, as opposed to system marks, for external devices are based on the sound of a teleprinter typing on-the-minute fix information. In the noisy environment of a small survey craft this leads to inconsistencies in mark spacing was well as late or lost marks, adding to the manual data reduction workload.

What is desired is means to eliminate excessive manual bathymetry and position data reduction, to provide automated bathymetry data logging for all sources, and to eliminate inconsistencies between system time/event and manual time/event marks.

SUMMARY OF THE INVENTION

Accordingly the present invention provides a precision fathometer interface adaptor for interfacing a shallow and a deep water sonar with a computer operated survey system. A 20-line to 16-line data selector is coupled to a multiplexed 16-line data bus. Two sources of bathymetric data are input to the data bus. For 5-bit BCD the four MSD or LSD are selected for input. The output is selected by three operational modes: Select Source 1, Select Source 2 or Automatic. The Automatic mode selects the bathymetric data output for the computer according to the water depth. An externally activated timer generates time/event markers for external devices.

Therefore, it is an object of the present invention to provide a precision fathometer interface adaptor for fully automated data logging and plotting for oceanographic surveys.

Other objects, advantages and novel features of the present invention will be apparent from the following detailed description when read in conjunction with the appended claims and attached drawing.

DESCRIPTION OF THE PREFERRED EMBODIMENT

Figure 1:
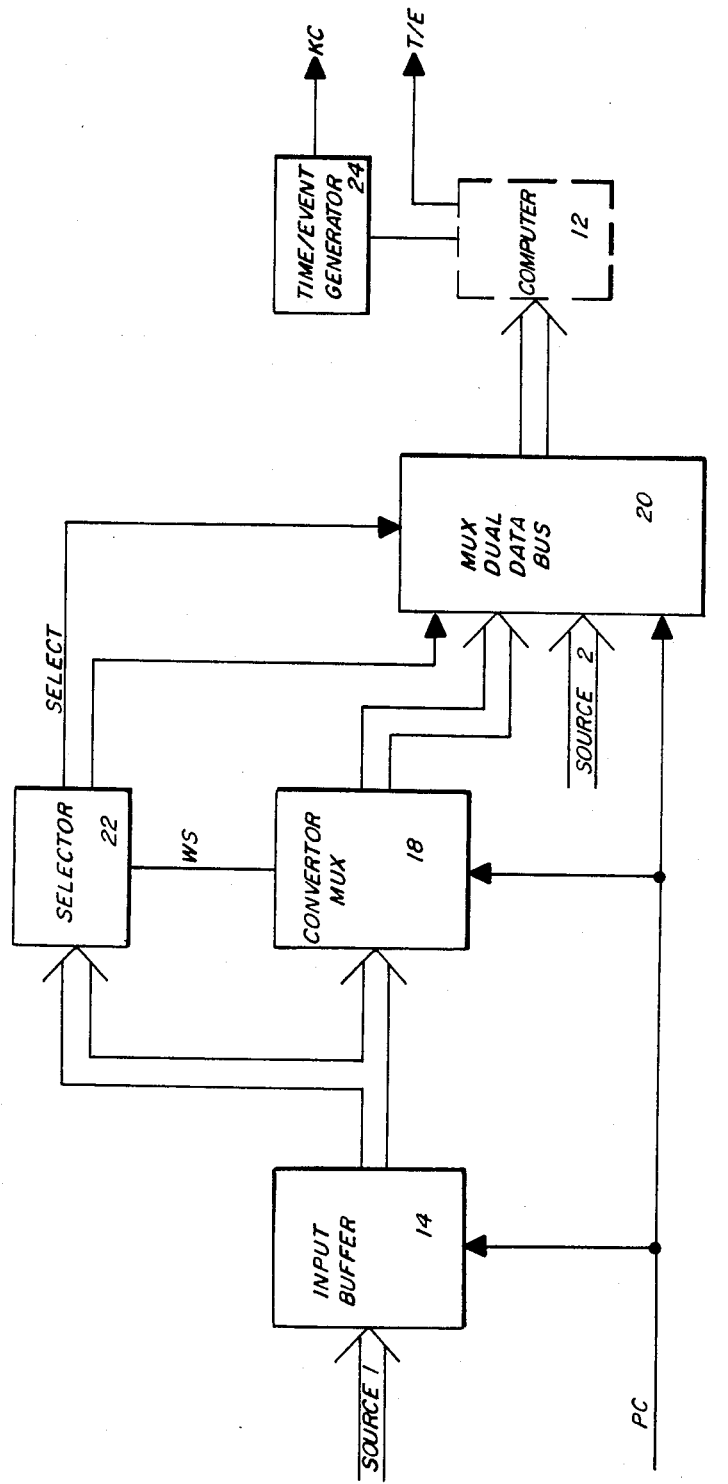
FIG. 1 is a block diagram of a precision fathometer interface adaptor according to the present invention.

Referring now to FIG. 1 two data sources, SOURCE 1 and SOURCE 2 such as from a deep water sonar and a shallow water sonar, are input to a precision fathometer interface adaptor 10. For illustration purposes the data word of SOURCE 2 is compatible with a control computer 12, while the data word of SOURCE 1 is not compatible with the computer. Source 1 is input to an input Buffer 14. The output of the input Buffer 14 is input to a Convertor Multiplexer 18 to convert SOURCE 1 data to a data word compatible with the computer 12 such as selecting either the four MSD or LSD of the input BCD data word. The compatible data words from SOURCE 1 are input to a Multiplexed dual Data Bus 20N. A Selector Unit 22 provides a SELECT signal to the Multiplexed Dual Data Bus 20 to determine whether SOURCE 1 or SOURCE 2 data will be transmitted to the computer. The SELECT signal may be determined manually at the Selector Unit 22, or may be determined automatically by testing a portion of the data from one of the data sources, SOURCE 1 in this illutration. The Selector Unit 22 also provides a pulse WS for selecting which BCD bits of SOURCE 1 are input to the Multiplexed Dual Data Bus 18, and a pulse LSD as information for the computer 12. The computer 12 provides a short pulse relay closure T/E for external devices as well as TTL event pulses, EVENT, to a Time/Event Generator 24 which provides an event mark of relatively long duration to provide a key closure KC for slower external devices. A timing pulse PC from the data digitizer which converts the SOURCE 1 and SOURCE 2 data into digitized BCD words provides the necessary clock pulses for the interface adaptor 10.

Figure 2:
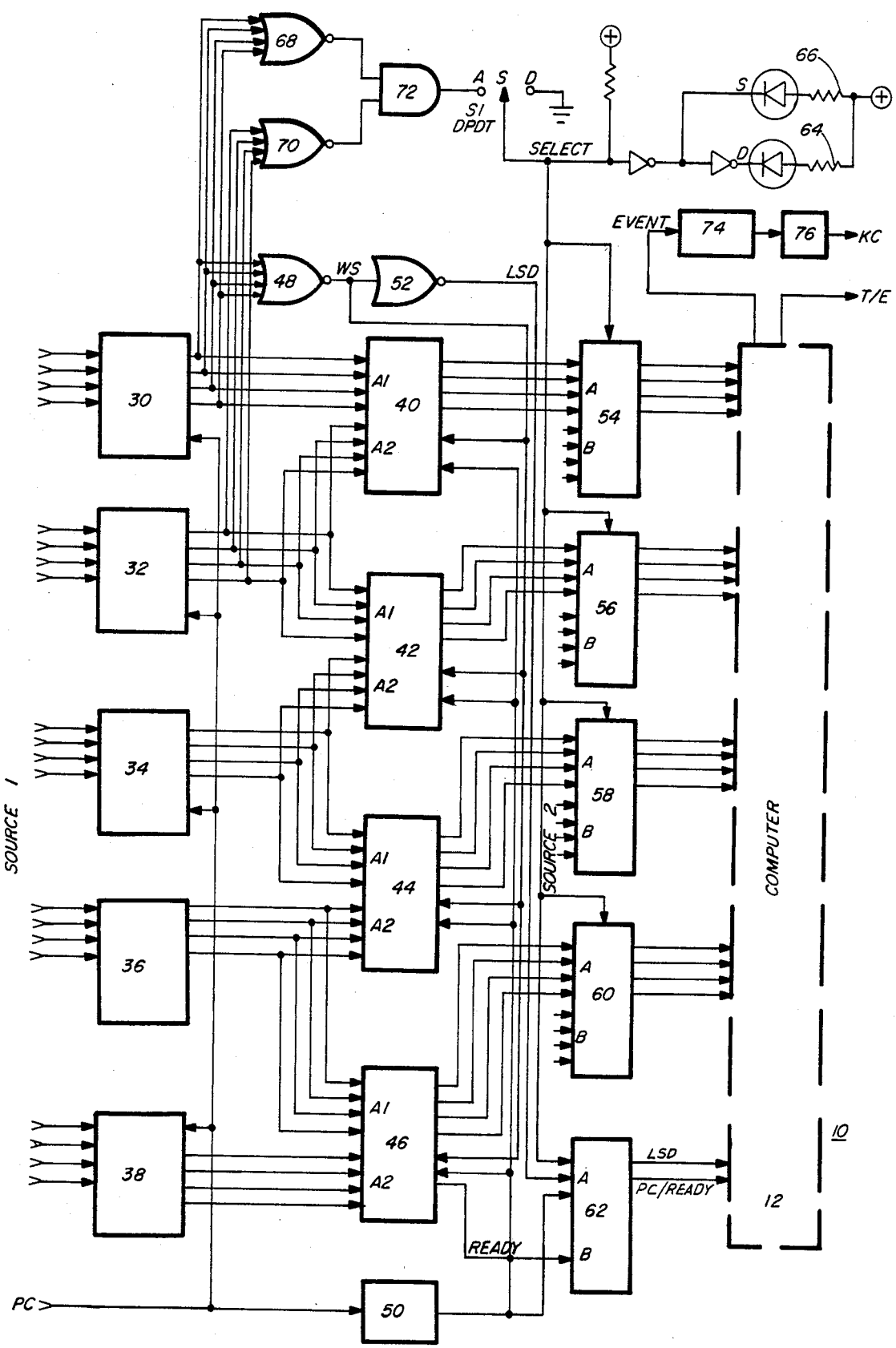
FIG. 2 is a schematic diagram for the precision fathometer interface adaptor of FIG. 1.

FIG. 2 is a schematic for an interface adaptor 10 having a parallel 4-bit BCD data source, SOURCE 2, and a parallel 5-bit BCD data source, SOURCE 1, as inputs with a 16-line output to the computer 12. For one application SOURCE 1 is a deep water (12 KHz) system and SOURCE 2 is a shallow water (40 KHz) system. The digitized depth data from SOURCE 1 is in the form of 20 parallel data bits (5-bit BCD) which is input into a plurality of D flip-flops 30, 32, 34, 36, 38, one for each BCD bit. A command control signal, PC, from a depth digitizer which digitized the input data latches the SOURCE 1 data into the flip-flops 30–38. The outputs from the four low order flip-flop 32–38 are input to the A2 sections of four quad-two multiplexers, 40, 42, 44, 46 to form the four low order BCD bits of a 20-line to 16-line data selector. The outputs from the four high order flip-flops 30–36 are input to the A1 sections of the quad-two multiplexers 40–46, to form the four high order BCD bits. Data selection of the high order A1 or low order A2 BCD bits from the multiplexers 40–46 is accomplished by testing the four lines of the high order BCD bit from flip-flop 30 for a high (1) or low (0) condition via a NOR gate 48. The output, WS, from the NOR gate 48 selects which of the inputs, A1 or A2. on the multiplexers 40–46 is fed through. A "1" on the WS line selects the low order BCD word, and a "0" selects the high order BCD word. The PC signal, properly delayed and phased by a delay line 50, such as a string of inverters, clocks the selected A1 or A2 input through the multiplexer 40–46. A signal, LSD, is developed by inverting WS via NOR gate 52 and is used by the computer 12 to locate the depth word radix. The four BCD bits from the multiplexers 40–46 together with the LSD and PC signals are input to the A inputs of five multiplexed dual data bus circuits 54, 56, 58, 60, 62. A SELECT line, when held low by mode switch S1 in the D position, enables the A outputs from the dual data bus circuits 54–62 and a D indicator LED 64. The interface 10 outputs the selected four BCD bits, LSD and PC to the computer 12.

SOURCE 2 is already compatible with the computer 21 in this illustration having four BCD bits (16 data lines). Therefore, the four BCD bits and a READY signal are input directly to the B inputs of the multiplexed dual data bus circuits 54-62. The SELECT line is held high by placing mode switch S1 in the S position to enable the B outputs of the data bus circuits 54-62 to the computer 12, and to light a S indicator LED 66. Thus, the computer 12 receives the four BCD bits, LSD and READY from the interface adaptor 10.

The automatic selection between the two input sources, SOURCE 1 and SOURCE 2, the two most significant digits MSD of SOURCE 1 from flip-flops 30 and 32 are tested by NOR gates 68 and 70. If any inputs to the NOR gates 68, 70 are high, that gate will inhibit an AND gate 72, providing a low output. With the mode switch S1 in the A position the low output produces the same result as when the mode switch is in the D position, i.e., SOURCE 1 is selected. If all inputs to the NOR gates 68, 70 are low, then the outputs are high and the AND gate 72 is enabled, providing a high output to the mode switch S1. The high to the mode switch S1 produces the same result as when the mode switch is in the S position, i.e., SOURCE 2 is selected. The LED indicators 64, 66 light to show which data input is being output to the computer.

Short duration (such as 200 ms) time/event T/E marks for external devices in relay closure format are generated by the computer 12 directly (TTL format may also be used). Longer duration (such as 1 sec.) time/event marks KC are generated by the interface adaptor 10 by using the TTL event pulse EVENT from the computer 12. EVENT is input to a timer 74 which is adjusted to output a pulse of the desired duration. The output of the timer 74 energizes a relay 76 to provide a key closure KC for slower external devices. The TTL output of the timer 74 may be substituted as needed for KC by bypassing the relay 76.

Thus, the present invention provides a precision fathometer interface adaptor for automatically logging digitized data from two separate sources and for generating time/event marks for external equipment. The adaptor has three operating modes to provide operator control and versatility over a wide range of topographic situations in the bathymetric situation using two different sonars for different depth ranges. The result is a completely automated survey data collection system which significantly reduces the manhours consumed by manual data reduction.

What is claimed is:

1. A precision fathometer interface adaptor for automatically logging digitized data from two separate sources for input to a computer, the data from one source being characterized by a first number of digits represented by a first plurality of parallel bit inputs and the data from the other source being characterized by a second number of digits that is one less than the first number and is represented by a second plurality of parallel bit inputs, said interface adaptor comprising:

an input buffer into which the digitized data from said one of said sources is input, said input buffer comprising a plurality of parallel bit flip-flops equal in number to said first number and each operable to provide corresponding first parallel bit outputs as output data;

means for converting the output data from said input buffer into a form compatible with said computer, said means for converting comprising a plurality of multiplexers equal in number to said second number, each connected to receive as a pair of inputs the parallel bit outputs of a different pair of said plurality of flip-flops and to provide a second parallel bit output corresponding to a selected one of the pair of inputs, whereby said means for converting provides as output data a number of parallel bit outputs equal in number to said second number;

means for multiplexing the output data from said means for converting with the digitized data from the other of said sources, said means for muliplexing comprising a plurality of dual data bus circuits equal in number to said second number and each receiving the parallel bit output of a corresponding one of said multiplexers as a first input and also receiving one of said second plurality of parrallel bit inputs as a second input, said dual data bus circuits being responsive to alternative conditions of a select signal to provide one or the other of said first and second inputs as a selected output to said computer; and means for generating said alternative conditions of said select signal for selecting the output from said multiplexing means for input to said computer.

2. A precision fathometer interface adapter as defined in claim 1, and wherein said means for generating said alternative conditions of said select signal comprises:

a first NOR gate connected to receive the parallel bit output of a first of said plurality of parallel bit flip-flops and operative to provide a first output condition in the absence of predetermined data input thereto and a second output condition upon presence of predetermined data input thereto;

a second NOR gate connected to receive the parallel bit output of a second of said plurality of paralel bit flip-flops and operative to provide a first output condition in the absence of predetermined data input thereto and a second output condition upon presence of predetermined data input thereto; and an AND gate responsive only to coincidence of one of said output conditions of said first and second NOR gates to provide one of said alternative conditions of said select signal and resonsive to all other output conditions of said first and second NOR gates to provide the other of said alternative conditions of said select signal.

* * * * *